United States Patent [19]

Simpson

[11] Patent Number: 4,673,130
[45] Date of Patent: Jun. 16, 1987

[54] SPRAY BOOM MOUNTING AND CARRYING SYSTEM

[76] Inventor: Virgil E. Simpson, Box 41, Ransom, Kans. 67572

[21] Appl. No.: 904,825

[22] Filed: Sep. 8, 1986

Related U.S. Application Data

[63] Continuation of Ser. No. 578,780, Feb. 9, 1984, abandoned.

[51] Int. Cl.$^4$ .............................................. B05B 1/20
[52] U.S. Cl. ...................................... 239/167; 239/172
[58] Field of Search .................... 239/159, 163–170, 239/172, 175

[56] References Cited

U.S. PATENT DOCUMENTS

| | | | |
|---|---|---|---|
| 2,305,913 | 12/1942 | Troyer | 239/168 |
| 2,575,521 | 11/1951 | Ireland | 239/169 X |
| 2,605,135 | 7/1952 | Torgerson | 239/167 |
| 2,946,514 | 7/1960 | Johnson | 239/167 X |
| 3,090,562 | 5/1963 | Richardson | 239/172 X |
| 3,231,198 | 1/1966 | Ackley et al. | 239/172 X |
| 3,447,750 | 6/1969 | Weston | 239/167 |
| 4,200,255 | 4/1980 | Schmidt et al. | 239/167 X |

FOREIGN PATENT DOCUMENTS 886277  1/1962  United Kingdom ................ 239/159

Primary Examiner—Andres Kashnikow
Assistant Examiner—Daniel R. Edelbrock
Attorney, Agent, or Firm—Thomas M. Scofield

[57] ABSTRACT

Systems and structures for elongate boom mounting, deploying and recovery for agricultural equipment, such systems mountable either at the front or rear end of a powered or towed vehicle; mounting masts and frame structures associated therewith for pivotally mounting elongate booms on mobile equipment in deployable and recoverable fashion, such utilizing manual operator power rather than power cylinders and the like; a frame for mounting elongate booms including a pair of rearwardly inclined boom support members, a pair of transverse upper and lower beam members connecting the upper and lower ends of the boom support members and a pair of horizontal, spaced apart, forwardly extending axial beams each connected to an upper end of one of the boom support members, sets of cables coupling the booms with the frame members, the inner ends of the booms pivotally mounted on the lower ends of the boom support members.

12 Claims, 21 Drawing Figures

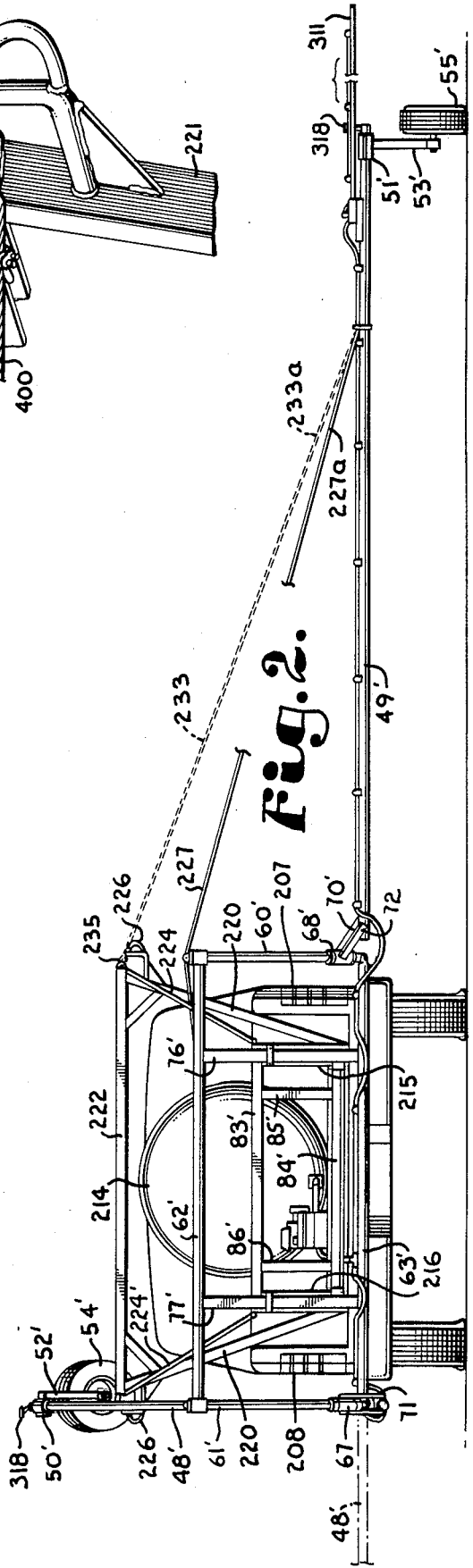
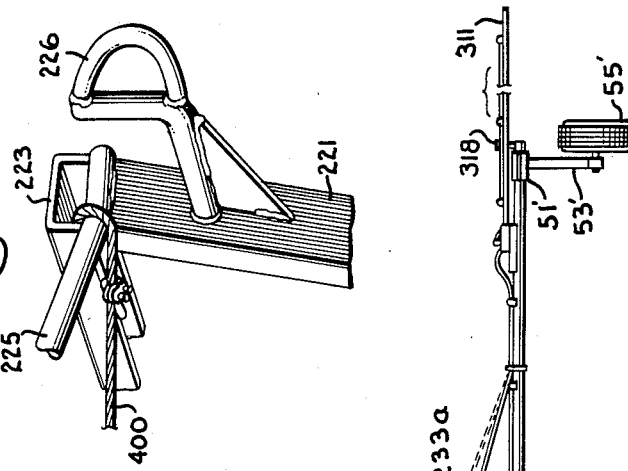
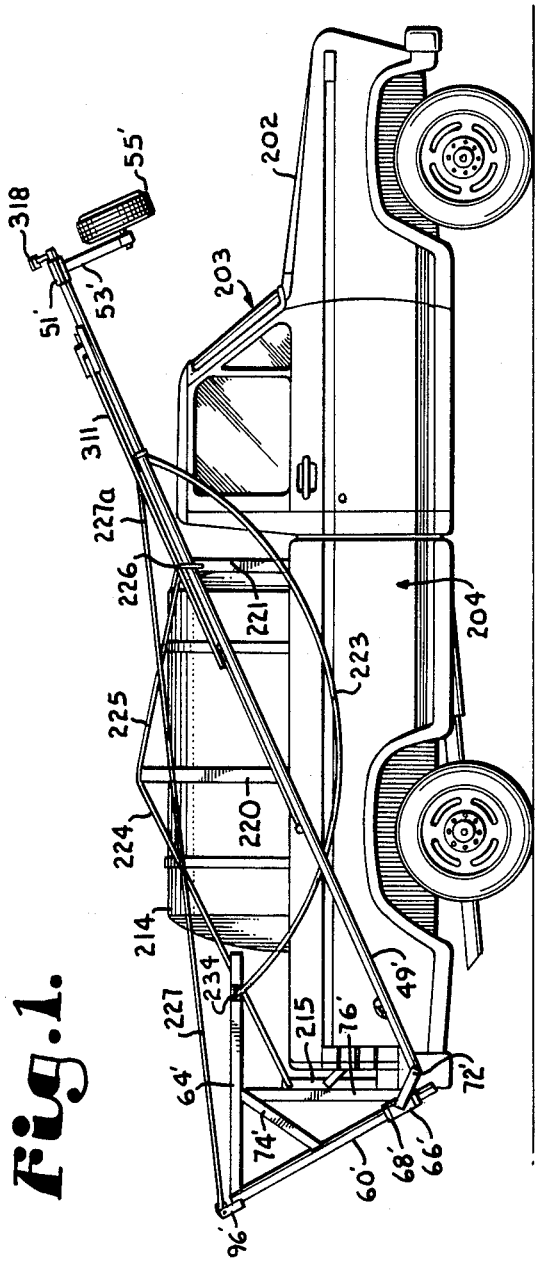

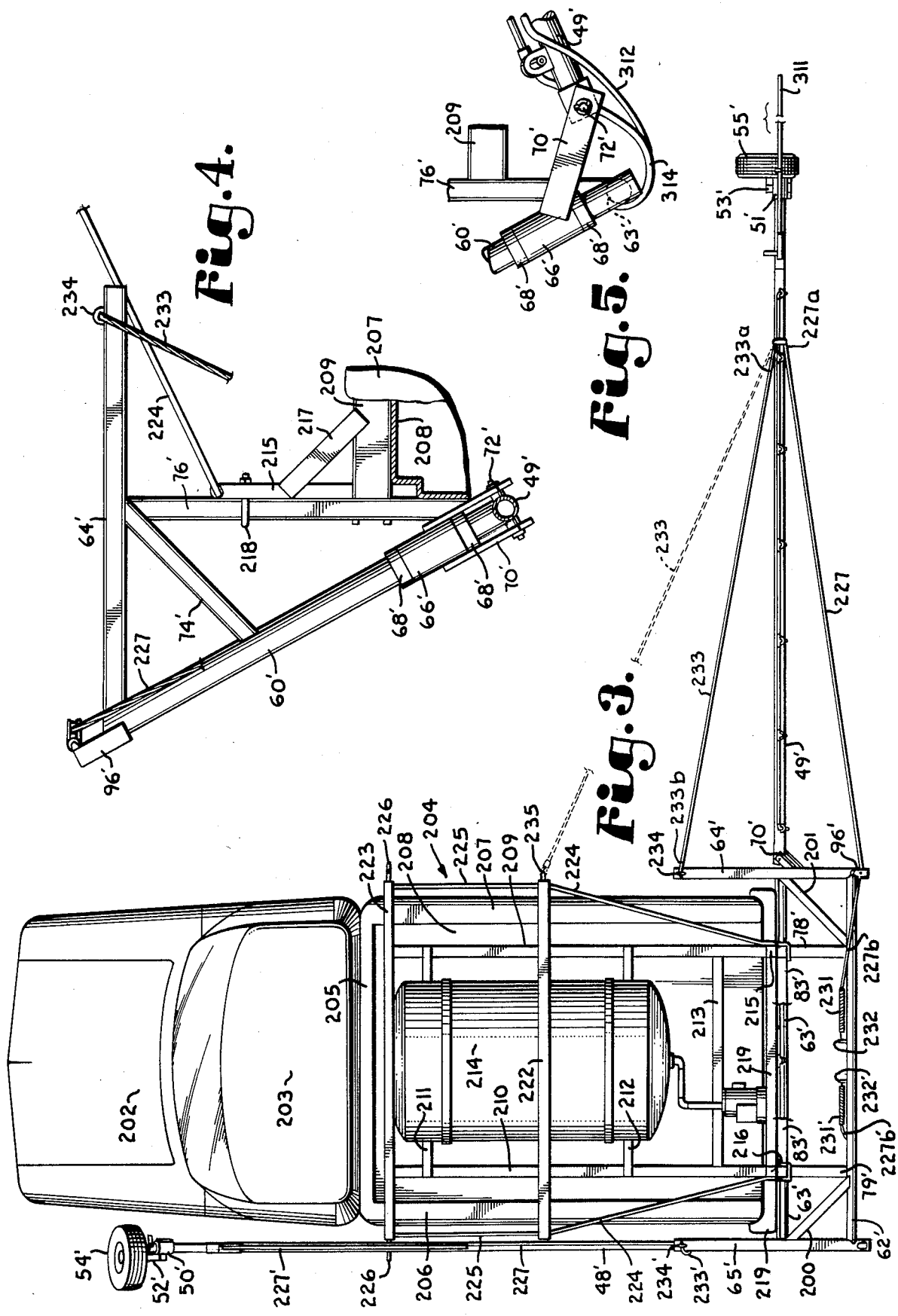

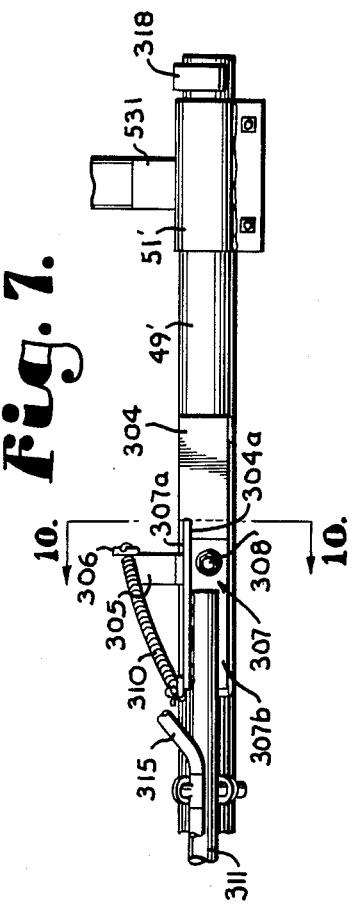
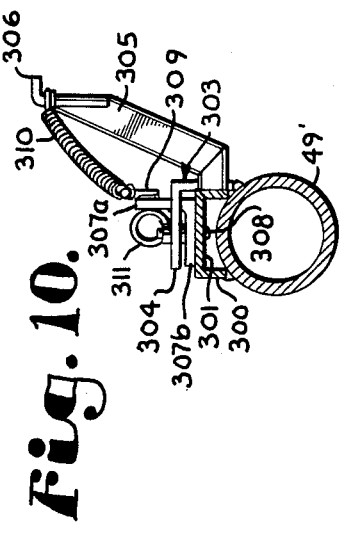
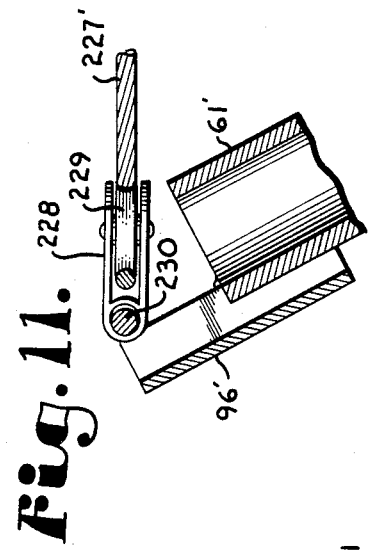
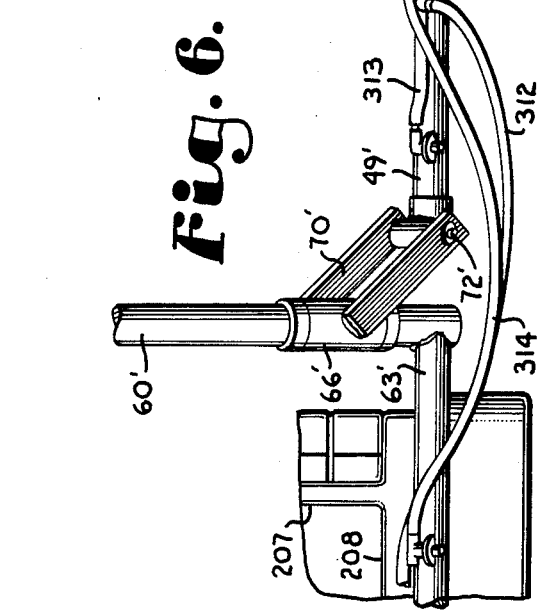
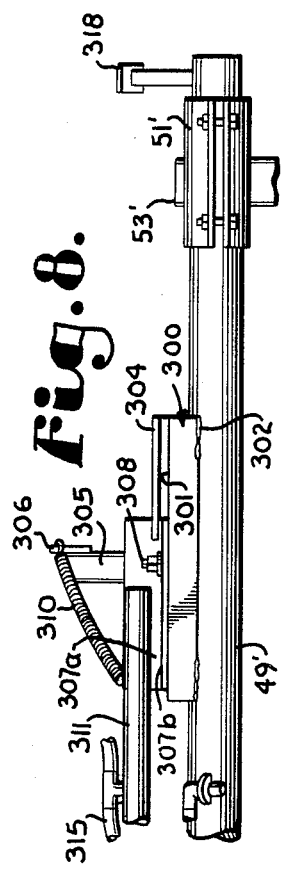
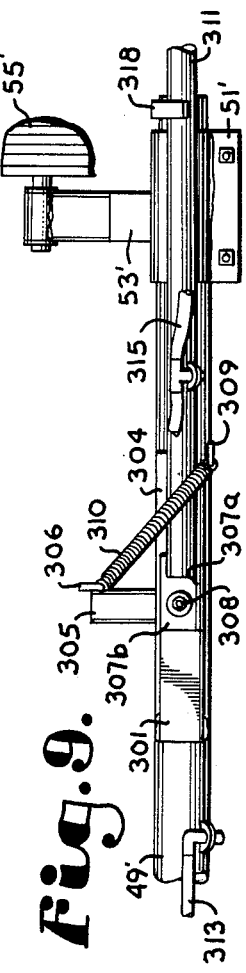

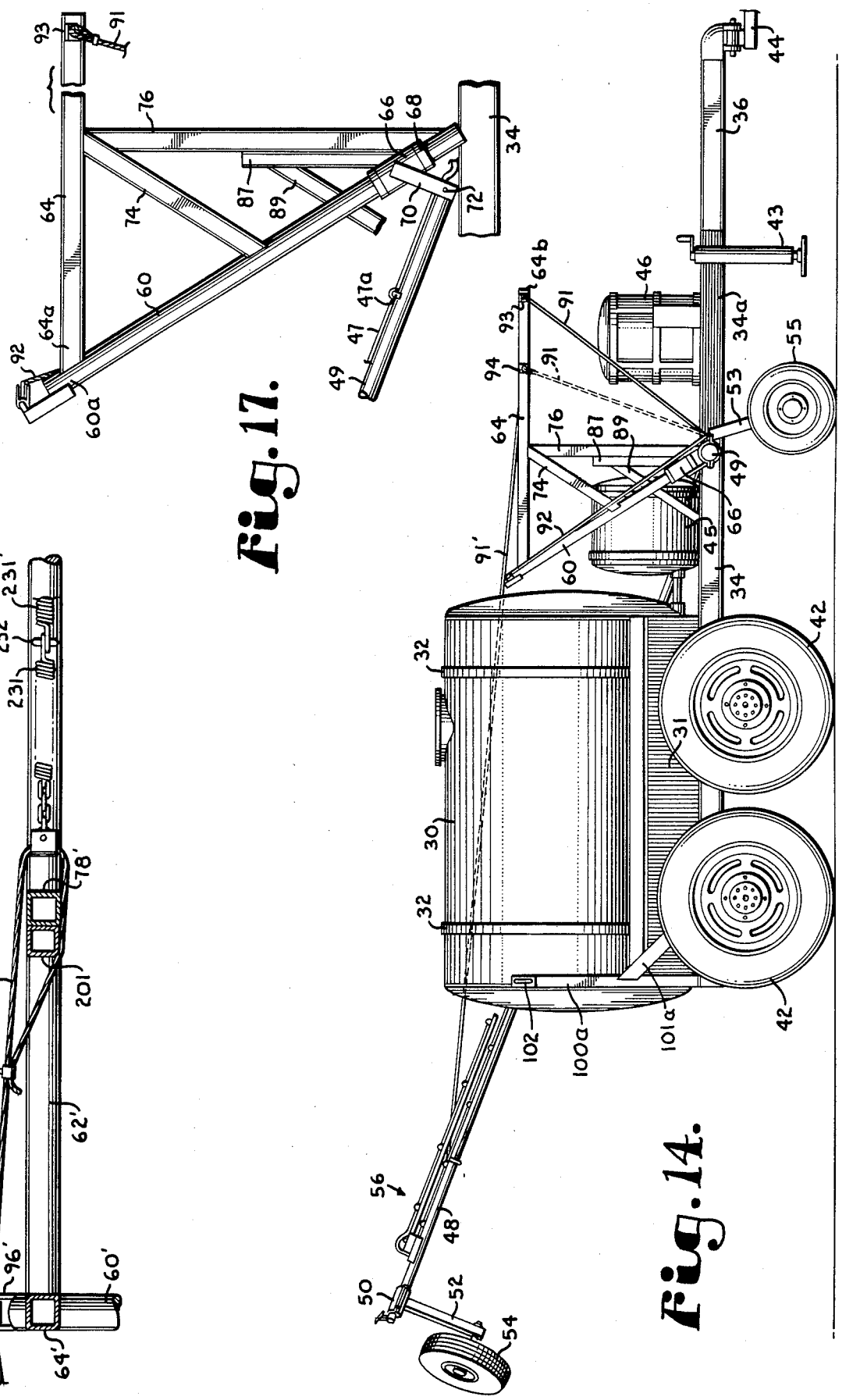

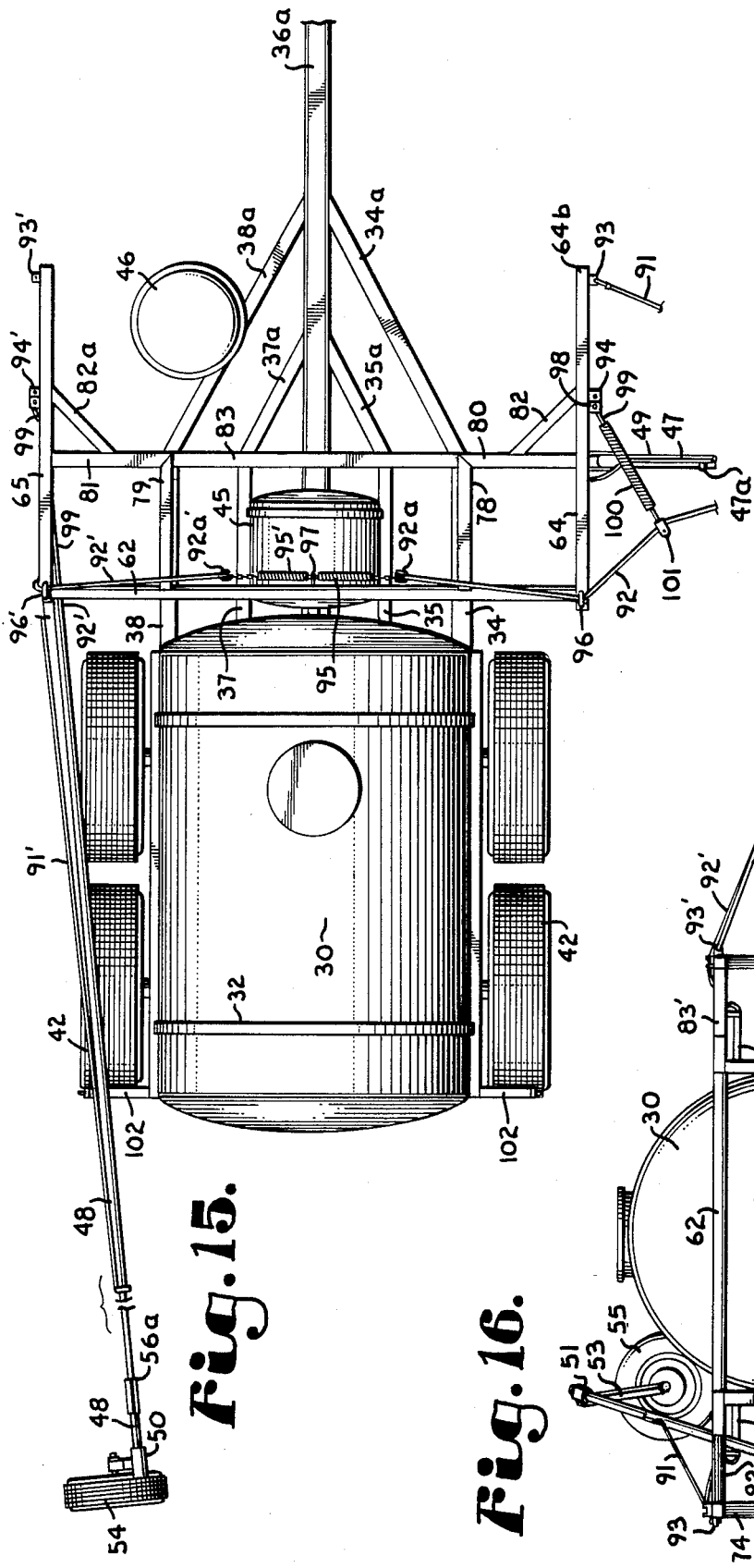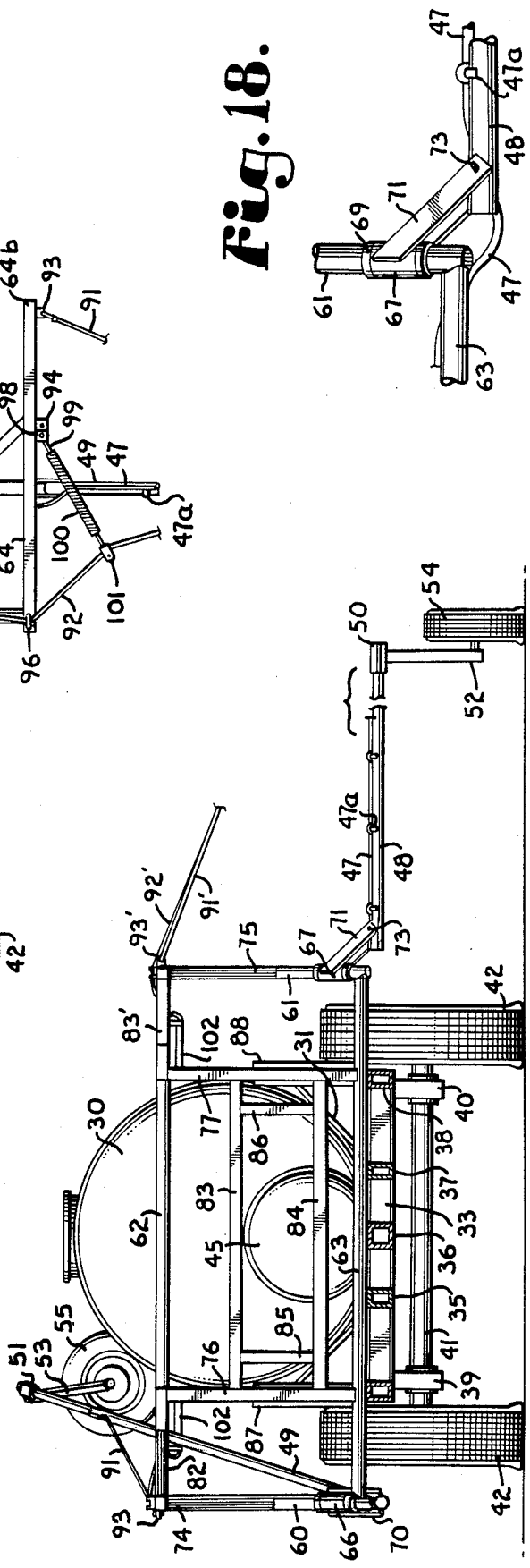

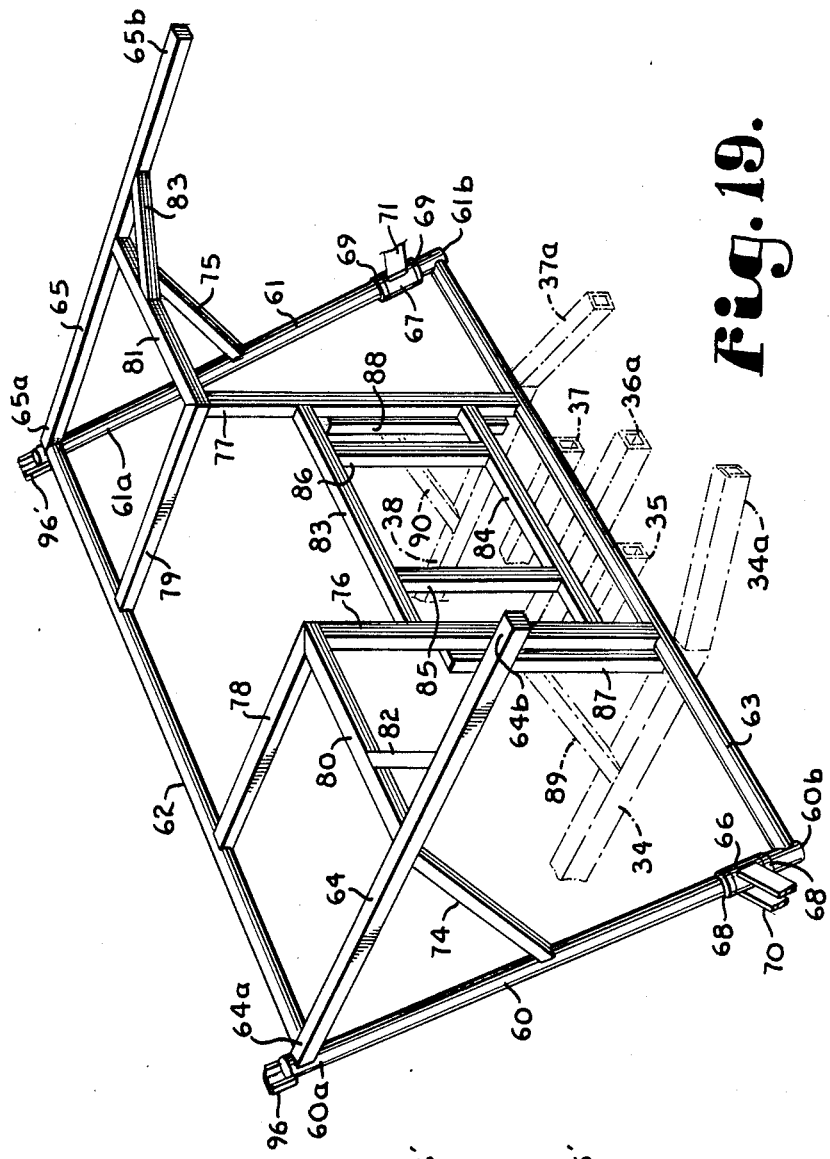
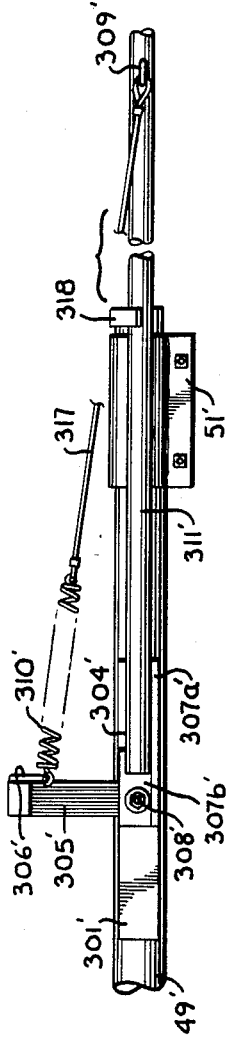
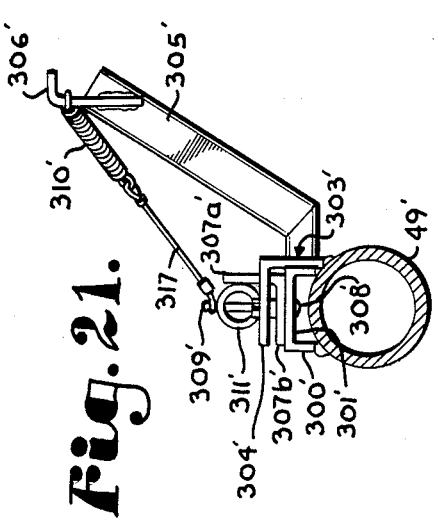

SPRAY BOOM MOUNTING AND CARRYING SYSTEM

This is a continuation of application Ser. No. 578,780, filed Feb. 9, 1984, now abandoned.

BACKGROUND OF THE INVENTION

Liquid spray systems attachable to powered farm vehicles or other vehicles towable thereby are well known to the agricultural industry. A typical construction involves the attachment of a pair of spray booms to the rear of a powered farm truck or vehicle (or alternatively to the front or rear of a towed farm vehicle), mounting a large supply tank on the vehicle body carrying the booms, connecting chemical tank hoses to spray nozzles on each boom and dispensing fluid fertilizer, chemicals, etc. from the tanks to crops or the farmland.

Very many spray boom assemblies and mountings therefor have been provided in the past for mounting and transport on tank vehicles of the character described. The basic purpose of such boom provision is the spreading of liquids along a path of substantial width in the direction of the movement of the vehicle. When the spray booms are rigged out for spraying action, they typically extend for a distance very much substantially wider than the width of the vehicle. Accordingly, various mechanisms, devices and structures have typically been provided in such assemblies for not only supporting and positioning the booms in the spraying operation, but also for rigging-in the booms alongside the vehicle for two purposes:

(1) So that the vehicle may transit roads or spaces narrower than the substantial width of the extended boom; and (2) In order that the vehicle may be stowed or garaged in such smaller spaces.

In the assemblies which include rigging-in capacities, all points along the lengths of the booms must clear the vehicle tires and road surfaces and, typically, permit ingress and egress from the cab of a vehicle by the operator (when the booms are mounted on the powered vehicle).

In the listing of the "Prior Art" hereinafter in this specification, devices having (1) forwardly folding booms (usually rearwardly attached) and (2) rearwardly folding booms (usually forwardly mounted on the vehicle) are listed and disclosed from very early in the art to present time.

Typically, the longer the boom, the more massive the support structure and more expensive the boom handling and rigging structure. As examples of such, reference is made to three relatively recent patents involving quite massive vehicles and massive and complex structural mountings for the boom supports and rigging means. These include U.S. Patents to Widmer, No. 3,887,132, issued June 3, 1974 "Boom Assembly"; Robinson, No. 3,927,832 issued Dec. 23, 1975 for "Horizontal Boom Lift Arms" and Batts, No. 4,138,063, issued Feb. 6, 1979 "Hydraulically Operated Fertilizer and Chemical-Spreading Boom".

What is needed is an effective, simple, manually operated (as opposed to power operated) boom mounting and rigging structure and system which involves a minimum of structure and weight yet effectively mounts the booms outwardly under all the problems and rigors of normal spraying operation and further permits the recovery thereof in handy, effective fashion. Verstility in placement of mounting is also desired. To provide such optimum boom mounting, rigging and handling means with, further, extendable end portions of the booms to provide effective boom length are the prime objects and purpose of this invention.

BRIEF DESCRIPTION OF INVENTION

The subject invention is directed to a novel boom support construction for use on a vehicle adapted to be driven or pulled over the surface of an agricultural field. The booms mounted on the boom support construction carry conventional spray means adapted to deliver liquid materials along two substantially parallel, spaced apart, elongate field paths. The vehicle itself carries conventional tankage, pumps, piping, etc. for such function. Each spray path is oriented substantially normal to the line of motion of a vehicle, with one of said paths being positioned on each side of the vehicle.

This specification show a rearwardly mounted, forwardly folding boom construction in one set of drawings (for example, FIGS. 1-3, inclusive) and a forwardly mounted, rearwardly folding construction in another set of figures (for example FIGS. 14-16, inclusive). The driven vehicle of FIGS. 1-3, inclusive and the towed vehicle of FIGS. 14-16, inclusive each are substantially rectangular in shape, thus having front and rear parallel, spaced apart ends opposed to one another and opposed, spaced apart, substantially parallel sides thereon.

Turning to the novel boom construction shown at the rear end of the powered vehicle and the front end of the towed vehicle in the drawings (to be described), a pair of boom support members are provided, each rigidly affixed with respect to an opposite side of the vehicle. Such are positioned adjacent, at or forward of the front end of the vehicle or, alternatively, adjacent, at or rearward of the rear end of the vehicle. Each such boom support member is mounted in a fixed position lying in a substantially vertically plane, such plane substantially paralleling the side of the vehicle, with the boom support members disposed at a rearwardly inclined angle from the vertical of approximately 15° to 35° in said plane.

Supporting these critical boom carrying support members are frames positioned on or carried by the vehicle, which frames are rigidly fixed with respect to the vehicle itself. Such frames must include means carrying and supporting the boom support members in the described rigid, spaced apart relationship to one another at the described vehicle locations. In such frames are typically provided two, normally horizontal, transverse, parallel, vertically spaced apart beam members which rigidly connect together and space apart the upper and lower ends of the boom carrying support members. Making up the balance of the frame, there are provided numerous inboard (with respect to said beam support members), typically vertical and horizontal additional frame members rigidly connected to one another and the noted transverse beam members, thus to make up an entire rigid frame stucture connectible to the vehicle or its frame. Such extra angled, interconnecting, subsidiary bracing as may be necessary or desirable may also be provided.

An elongate, normally straight boom member is pivotally mounted on each respective angled boom support member, positioned at the lower end thereof, with the said engagement provided at the inner end of the boom itself. Additionally provided, with respect to the frame structure previously described, are a pair of substantially horizontal, spaced apart, parallel cable support beams, one such beam connected to and extending forwardly from the upper end of each of the boom support members in substantial parallel relationship with one another, the adjacent vehicle side and longitudinal axis of the vehicle.

First, rearwardly oriented cable means are provided engaging, with one end thereof, the rear portion of the frame structure past the tops of the boom support members and the booms intermediate the ends thereof with the other ends of the cables. Second, forwardly positioned cable means are further provided coupling the intermediate lengths of the booms with portions of the forwardly extending cable support beams.

Brackets are provided on each side of the vehicle spaced apart from the boom support frame structure, for removably engaging outboard portions of the booms on the respective sides of the vehicle in order to support such booms in a transport position substantially parallel to the vehicle side and extending with respect to the ground at an angle of approximately 15° to 35° from the horizontal.

Between the pivotal mounting of the booms at the lower ends of the boom support members and the cable suspension thereof from the frame, the booms are adapted to be swung from a first, substantially level, ground paralleling (spraying) position essentially normal to the longitudinal axis and direction of travel of the vehicle to a second, upwardly angled (stowage) position along the sides of the vehicle substantially paralleling the said sides and direction of travel of the vehicle.

Rotatable wheel means are connected to the booms at or adjacent the ends thereof on substantially vertical beams extending downwardly with respect to the booms. Such wheels support the outer ends of the booms above ground level when they are in substantial horizontal orientation for spraying use as the vehicle moves over the ground.

A 180° pivotable extension of the outer part of each boom may be provided, such extensions mounted adjacent the outer, free end of each boom inboard of the wheel mounting thereon. Such pivotal extensions may be rotated from a retracted position overlying the boom to a use position extending axially outwardly, 180° opposed to the retracted position, for spraying use.

The inboard ends of each boom are pivotally mounted on pins engaging yokes, which yokes are welded at their inner ends to collars rotating on the lower ends of the beam support members. The arms of such yokes extend downwardly from such collars at an angle from the horizontal to enable proper boom positioning in use and storage.

It is the combination of the frame support structure, the collar mountings of the inboard members of the boom and the cable mountings of the booms with respect to portions of the frame which provide the unique advantages of the subject boom mounting and handling structure and system, as will be described in more detail herebelow.

OBJECTS OF THE INVENTION

The first object in the invention is to provide new improvements in the art of mounting and suspending spray booms with respect to a vehicle, which improvements enable ready, simple deployment of the spray booms into action position and, further, offer equally ready, simple and effective means for removing the spray booms from deployment in the spraying position and translation or movement of same to a storage and transport position or mode.

Another object of the invention is to provide improved means of and modes for mounting and handling in new effective fashion, deployable and retractable spray boom constructions on a vehicle.

Yet another object of the invention is to provide such improvements in support structures and mounting means for deployable and recoverable spray booms as may be readily mounted on, at or adjacent either the rear end of the vehicle or the front end of the vehicle, whereby to provide an exceedingly versatile mounting which will be adaptable to all sorts of vehicles utilized in spraying procedures, particularly including trucks of many types and towed vehicles.

Another object of the invention is to provide a support construction for deployable spray booms which is not only mountable at either end of a vehicle (front or rear for use) but which incorporates a structure wherein the spray booms, when recovered for storage or in transport position, always lie along the vehicle body at a predetermined shallow angle which is optimum both for transport and storage. Such improvements also minimize the requirement for power handling of the booms.

Another object of the invention is to provide a support structure for the spray booms which is operable to permit storage of the booms along the sides of the vehicle carrying the support structure independent of whether the structure is mounted forwardly or rearwardly of the vehicle.

Still another object of the invention is to provide novel extension means associated with the booms which enable a considerable increase in the operating length of the spray booms, yet which extension is readily, easily and safely retractable when the boom is to be deployed for storage and transport.

Another object of the invention is to provide a spray boom support system structure wherein the spray booms are pivotally mounted at their inboard ends upon rearwardly angled boom support members, whether the boom support structure is mounted at the forward or rearward end of the vehicle.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are used to indicate like parts.

Rear Mounted, Forwardly Folding Spray Boom Suspension

FIGS. 1–13, inclusive show a first form of the subject spray boom mounting and manipulating construction involving the support structure for the boom being mounted at the vehicle rear end (with respect to the normal direction travel of the vehicle during the spraying operation) in such manner that when the booms are deployed for spraying action, they are deployed at the rear end of the vehicle and, when they are retrieved for road transport or other of the vehicle, they fold forwardly along the length of the vehicle.

FIG. 1 is a side elevation of a pickup truck having a spray tank reservoir and spray boom system associated therewith, the subject boom mounting and deploying system mounted thereon, the booms being retrieved or folded into the travel position.

FIG. 2 is a rear view of the pickup truck of FIG. 1 with left hand spray boom stowed for travel in full lines in the view and the right hand boom deployed for spraying operation shown in full lines in the right hand side of the view.

FIG. 3 is a top elevation of the vehicle of FIGS. 1 and 2 with the spray booms positioned in the same manner as in FIG. 2, specifically, the left hand boom being recovered, stowed and positioned for travel of the vehicle, the right hand boom being deployed in spraying position for spraying use.

FIG. 4 is an enlarged, fragmentary view of the left hand side of FIG. 1 (the spray boom support structure positioned at the rear end of the pickup truck of the view of FIG. 1), showing, in enlarged detail, the mounting of the end members of the frame and boom support member construction with, however, the boom shown deployed in spraying position toward the observer, the opposite position from the showing of FIG. 1.

FIG. 5 is an enlarged fragmentary detailed view of the lower left hand end corner of FIG. 1 showing the manner of juncture of the inboard end of the spray boom with the lower end of the boom support member on the vehicle frame, the boom in the position of FIG. 1, specifically that is, recovered and stowed for travel position, opposite to the showings of FIGS. 2–4, inclusive.

FIG. 6 is an enlarged detail of the lower left center of FIG. 2 showing the corner juncture of the inboard end of the spray boom and the lower end of the spray boom support member on the vehicle frame, the spray boom being deployed in the position of FIGS. 2–4, inclusive.

FIG. 7 is an enlarged, vertical plan view, from above, of the outermost portion of the right hand end of the deployed spray boom of FIGS. 2, 3 and 6 with, however, the final pivotal extension not outwardly deployed as is the case in FIGS. 2 and 3.

FIG. 8 is a rear view of the apparatus configuration seen in FIG. 7, the view looking upwardly from below in FIG. 7 with, again, the final extension of the spray boom not being outwardly deployed for use.

FIG. 9 is a vertical plan view of the same structure seen in FIGS. 7 and 8, but with the final spray boom extension pivoted into the outboard (spraying) position as seen in FIGS. 2 and 3.

FIG. 10 is a view taken along the line 10—10 of FIG. 7 in the direction of the arrows.

FIG. 11 is an enlarged side, sectional view of the topmost end of the rearwardly canted boom support member whose bottom end is seen in FIG. 6, the top end illustrated being shown at the leftmost center portion of FIG. 1 or its opposite.

FIG. 12 is an enlarged perspective detail of the bracket at the forward end of the tank reservoir and boom mounting frame of FIG. 1 (just behind the truck cab) adapted to receive an intermediate portion of the length of the boom thereover in folded travel position.

FIG. 13 is a fragmentary, partly sectioned view of the connection of the resiliently mounted rear end cable for the boom particularly illustrating parts seen in vertical elevation in the lower left corner of FIG. 3. Specifically, the viewer is looking horizontally and rearwardly at the horizontal beam bearing the spring loading of the inboard end of the rearmost cable with the cable being fed out through the pulley which is that seen in the upper left corner of FIG. 4 and in FIG. 11. The structure shown in an option.

Forward Mounted, Rearwardly Folding Spray Booms

FIGS. 14–19 show a towable vehicle wherein the subject spray boom mounting frame and boom support elements are positioned adjacent or at the forward end of the vehicle. In this case, the spray booms deploy outwardly at the forward end of the vehicle and fold rearwardly to storage and transport position along the side of the vehicle.

FIG. 14 is a side elevation of a towable spray vehicle having a front end mounting of the subject boom support structure. In full lines in the view, the near spray boom is shown deployed at right angles to the vehicle longitudinal axis, specifically, toward the viewer. The boom on the far side of the vehicle is shown positioned upwardly into the storage or travel position.

FIG. 15 is a top plan view of the device of FIG. 14 showing the spray boom in the downward side of the view deployed in spraying position with the spray boom in the upper side of the view stowed for travel.

FIG. 16 is a front view of the device of FIGS. 14 and 15 with front frame structural parts cut away to better illustrate the support frame for the booms. In this view, the left hand boom is retracted in storage position and the right hand boom is deployed in spraying position. This is the opposite of the showing of the two previous figures.

FIG. 17 is an enlarged fragmentary view of the boom support structure seen in the right center of FIG. 14, the boom, in this view, being deployed in storage position, opposite to the view of 14, but like the view of FIG. 16.

FIG. 18 is an enlarged detail of the boom inboard end connection to the rearwardly angled boom support member, detailing such.

FIG. 19 is a three-quarter perspective view from above front of the support frame for the boom support members for the device seen in FIGS. 14–18, inclusive. The frame itself and beam support members are seen in full lines, the underlying vehicle structure supports being shown in dotted lines.

FIG. 20 is a view like that of FIG. 9, but showing a modified form of mounting for the pivotal end extension of the spray boom.

FIG. 21 is a view like that taken along the line 10—10 of FIG. 7 in the direction of the arrows with respect to FIG. 20 but with the extendible boom reversed from the position of FIG. 20.

FIGS. 14–19 Inclusive

In order that the boom suspension system which is a particular subject of this invention be clearly understood in the easiest possible manner, reference is first made to FIGS. 14–19, inclusive wherein the boom suspension structure is positioned at the forward end of the towable vehicle with the mounting of the boom suspension structure frame and the elements thereof relatively open for viewing in its mounting on the vehicle frame substructure. Additionally, the perspective view of FIG. 19 is directed to the elements of a typical framework for mounting and suspending the rearwardly angled boom support members and forwardly extending cable support beams with respect to a vehicle frame.

First briefly looking at the basic vehicle structure, which is entirely conventional, there is first seen a tank 30 which is received on cradle members 31 to which the tank is connected in conventional manner by straps 32.

The bed of the vehicle is made up of tranverse base members 33 to which are welded the elongate, longitudinal floor members 34–38, inclusive. At the forward end of the vehicle, these longitudinal members converge on center member 36a (the draw bar) at 34a–38a, inclusive.

On the underside of this frame are secured suitable structural members 39 and 40 (FIG. 16) which carry bearings through which the axles 41 for wheels 42 are mounted in conventional fashion. A conventioal jack stand 43 to support the front end of the frame (when not attached to a towing vehicle) is seen at 43. A schematic connection means 44 to a towing vehicle is seen in the right in FIG. 14. Secondary tanks 45 and 46 may be mounted upon the frame structural members in any desired conventional manner to provide any mix of liquids to be sprayed as may be required and desired for a specific operation. The details of the piping connections, the pump means for transmitting the liquids from the tanks to the tubes carried on the spray booms and the motors for the pumps, as well as the piping or tubing connections to the booms are not seen as these are entirely conventional. In FIGS. 15, 16 and 17, the tubings 47 which are carried by the spray booms are seen with the spray nozzles 47a shown in these views as alternatively provided for forward spraying or rearward spraying. However, the latter, as seen in FIG. 15, is preferred.

With there being basically provided a towable vehicle comprising a wheel supported frame with a front tow connection such having sufficient free forward structural frame or base to provide space for mounting such additional tanks, pumps, motors, etc. as may be required for the spraying operation, it is then required to mount the basic boom support frame construction (seen in front perspective from above in FIG. 19) on the horizontal front structurals 34–38, inclusive. Because of the geometrical complexity and difficulty of visualization of the beam parts with respect to one another in side, front and top views, the structure of the boom support frame and boom support members will first be described with respect to FIG. 19 and the parts thereof numbered, with corresponding numbers being applied to the like parts seen in FIGS. 14–17, inclusive.

It should also be noted that the booms themselves and their preferred extensions are shown in much more elaborate detail (and will there be more fully described) with respect to the rear end mounted device of FIGS. 1–13, inclusive and 20 and 21, respectively. Herein it is merely noted for the purposes of the instant discussion that the booms which are mounted in deployed and recovered manners by the boom support frame, members and constructions to be described are elongate hollow tubes or cylindrical beams (prefereably) 48 and 49 having collars 50 and 51 fixed at or adjacent the ends thereof. The latter mount forwardly angled normally downwardly extending wheel carrying beams 52 and 53. The latter mount wheels 54 and 55 in rotatable fashion thereon by suitable axles, bearings, etc. not detailed. At 56 (upper left hand corner of FIG. 14) is schematically indicated a boom extension of the type seen in FIGS. 7–10, inclusive and 20 and 21. Such will there be described in detail. Such extension is not seen detailed on boom 48 in FIG. 15, merely the mounting clip 56a therefor. Nor is such an extension seen in FIG. 16 on the boom construction there illustrated, for clarity of viewing.

In order to mount the booms 48 and 49 with repsect to the vehicle frame in a manner wherein they may be deployed outwardly for spraying purposes and retrieved inwardly for storage and transport purposes, it is basically necessary first to provide two boom support members 60 and 61, each rigidly affixed with respect to an opposite side of the vehicle which is to carry the booms and here positioned adjacent, at or forward of the front end thereof. If the front end of the vehicle in question previously described is regarded as at the front end of the large spray tank 30, then the boom support members 60 and 61 are mounted forward thereof. If the front end of the vehicle is regarded as the forward ends of the straight portions of base structural members 34–38, inclusive, the lower ends of said beams are shown mounted at the front end thereof. If the front end of the vehicle is regarded as forward of that point with respect to angled structurals 34a–38a, then the boom support members are mounted adjacent the front end of the vehicle. At any rate, each said boom support member is mounted in a fixed position lying in a substantially vertical plane substantially paralleling the side of said vehicle and disposed at a rearwardly (with respect to the rear portion of the vehicle or the direction of normal travel of in the spraying operation) inclined angle from the vertical of approximately 15° to 35°.

In order to provide the described structural mounting, a frame is provided associated with said boom support members 60 and 61 to (1) provide cable attachments and (2) fix the boom support members with respect to one another and the cable carrying means and, also, with respect to the vehicle frame. As will be shown and described, there is little variation permitted with respect to the relationship of the cable carrying means or members with the boom support members. However, considerable variation is possible with respect to the inboard frame structure which mounts the cable receiving members and boom support members with respect to one another and the vehicle frame. One convenient form is shown in upper front perspective in FIG. 19 and side, front and top views in FIGS. 14–16, inclusive. The frame mounting provided with respect to the structure of the earlier figures yet to be described (the rear mounting on the pickup truck of FIGS. 1–13, inclusive) is extremely similar to, but slightly different from that seen and described with respect to these figures.

The said frame includes two normally horizontal, transverse, parallel, vertically spaced apart upper and lower beam members 62 and 63. Such transverse beams rigidly connect together and space apart the upper and lower ends of the boom support members 60 and 61 with respect to one another. With this basic rectangular frame oriented in the manner previously described, there are additionally provided inboard (with respect to said beam support members) additional normally vertical and normally horizontal frame members rigidly connected to one another and said transverse beams, etc. to make up a rigid frame structure connectible to the vehicle. However, in order to provide the aforementioned cable connection and further enable the buildup of the inboard structural frame just mentioned, there are provided a pair of substantially horizontal, spaced apart, parallel beams 64 and 65, one such beam connected to and extending forwardly from the upper end (60a 60b) of each of the boom support members 60 and 61 in substantial parallel relationship with the adjacent vehicle side, as well as the vehicle longitudinal axis (beam 36a) and the normal direction of travel of the vehicle in the spraying operation. The latter is, of course, along the longitudinal axis of a vehicle to the right in both FIGS. 14 and 15. Beam members 64 and 65 have rearward ends 64a and 65a secured by welding or other equivalent means to upper ends 60a and 60b of the beam support members 60 and 61 and forwardly extending free ends 64b and 65b, respectively. While the cable connection pointss are not shown on beams 64 and 65 in the view of FIG. 19, on boom support members 60 and 61 there are shown, adjacent the lower ends 60b and 61b thereof the mountings thereon of rotatable collars 66 and 67. Such collars are fixed in vertical position on member 60 and 61 by welded on rings or ring sets 68 and 69. Yoke members 70 and 71, which are welded to collars 66 and 67 and pivotally pinned at 72 and 73 to the inboard ends of booms 49 and 48, respectively are shown welded or otherwise fixedly attached to collars 66 and 67 at their opposite ends.

The mutual structure bracing and connection of boom support members 60 and 61 and cable support members 64 and 65 with respect to one another and the basic vehicle frame will now be described, again leading from and initially referring to FIG. 19. As previously noted, this structural framing to be described can be varied as desired, so long as (1) boom support members 60 and 61 and cable support members 64 and 65 are positioned and supported with respect to one another in the manner described and (2) a rigid structural relationship between said beam support and cable support members with respect to the vehicle frame or parts of the vehicle is established. With these provisos, angled braces 74 and 75 are welded or otherwise fixedly attached intermediate the ends of beam support members 60 and 61 and the corresponding cable support members 64 and 65. Vertical beams 76 and 77 are welded at their lower ends (or otherwise fixedly attached) intermediate the outer ends of lower transverse beam 63 and extend upwardly therefrom. From the top ends thereof there extend rearwardly horizontal beams 78 and 79 and lateral horizontal beams 80 and 81. Additional angled brace beams between the latter and cable support beams 64 and 65 may be provided at 82 and 83. Further in order to rigidly structurally connect together and brace vertical beams 76 and 77, there are provided two intermediate, horizontal connecting beams 83 and 84 which may have additional vertical bracing members fixed therebetween as at 85 and 86.

With the description of the latter structures, there has been provided a rigid frame which not only provides the means by which the entire frame structure may be attached to the vehicle frame or structure, per se, but also rigidly interlocks and structurally braces the critical beam support members 60 and 61 and cable support members 64 and 65 with respect to one another. The means which are provided to structurally connect the described, entire frame structure to the vehicle frame or structure may be considerably complex. However, simply for illustrative purposes here, and because such structural interconnection would be of a very conventional sort, only two pairs of such members are illustrated. Thus, short vertical beams 87 and 88 are provided immediately behind vertical beams 76 and 77 and are strapped, bolted or welded thereto in rigid manner. The lower ends of said short vertical beam 87 and 88 are welded or otherwise fixedly attached to vehicle frame structures such as members 34 and 38. Angular braces 89 and 90 are additionally shown further connecting base beams 34 and 38 with the short vertical members 87 and 88.

The spray booms 48 and 49 are each supported by two cables or cable equivalent means, one such cable being forwardly mounted (in two alternative positions) and the other, second cable being mounted in a rearward position. The forward cable is generally designated 91, the rearward cable designated 92. The best showings of equivalent cable mountings (boom lengths make it difficult to make full cable-boom showings) are seen in FIGS. 2 and 3 of the rear end mounting of the subject invention to be described. In FIG. 3, the forward, nonresilient or non-spring loaded cable and its connection to the forward end of the cable member equivalent to member 64 is clearly shown, as well as its connection to the boom intermediate its ends and short of the wheel mounting. The resiliently mounted rear cable is also visible at the bottom of FIG. 3, such being connected inboard through the top of the beam support member equivalent to member 60 to the center of the transverse member equivalent to member 62. Thus, reference can be made to FIGS. 2 and 3 for relative cable positions in the description of the current figures.

Two positions, 93 and 94, are provided on beam 64 to be engaged by the inboard end of cable 91. (In the views 14–16, inclusive, the cable means for the respective booms and their connections on the cable beam and the frame are numbered the same, but primed for simplicity.) Cable 91 is equipped with a loop or pin at its inboard end for removable engagement with stations 93 and 94. Because of the difficulty of illustrating the cable extension with respect to the other structural members of the frame in the various views, the following deviations from precise accuracy have been indulged in the views of FIGS. 14–16, inclusive (taking the cable mounting showings of FIGS. 2 and 3 into account, in addition). In FIG. 14, cable 91 is shown in its connection with station 93 in full lines with such cable leading down to the forward side of boom 49 as would be the case analogous to FIG. 3. In this figure, in dotted lines, cable 91 is shown in the bottom storage position to be described. The only cable shown with respect to a stowed boom in the view of FIG. 14 is cable 91' with respect to boom 48 which, at its inboard end, would be connected to station 94'. To be visible in the view of FIG. 14, cable 92 is shown as connecting to the forward side of boom 49 which could be the case, but, more typically, would be to the rearward side of the boom as is seen in the lower cable of FIG. 3.

Referring to FIG. 15, the boom 49 is deployed in spraying position, whereby cable 91 is connected at its inboard end to station 93. Cable 92 passes through a pulley or loop connection (for detail of pulley connection see FIG. 11) and passes inboard along upper horizontal beam 62 to engage with an inboard end spring 95. The loop or pulley connection is generally designated 96 and the inboard end of the spring is connected to loop 97, the inboard end of cable 92 being designated 92a. A cable tightener for cable 92 may be employed involving connection 98 along member 64 intermediate the ends thereof, cable 99 having spring 100 in the length thereof and pulley 101 through which cable 92 threads. This optional latter device also helps take up cable slack upon storage of the boom. The inboard connection elements of the opposed rear cable 92' are numbered the same and primed as those described for cable 92. In the view of FIG. 15, at the upper side of the view with respect to the folded boom 48, the cable showing is simplified by omitting the showing of the inboard portion of cable 91' and not attempting to detail the slack position of cable 92'. It is noted that the unseen inboard end of cable 91 would be attached at station 94' rather than station 93' in the case of a deployed position. It can be seen that the forward cable 91' is shown properly positioned on the forward side of the boom with the rearward cable 92' being connected to the rearward side of the boom analogous to the showing of FIG. 3.

In FIG. 16, only the cable 91 is seen in the left hand portion of the view with the boom 49 in stowed position. It would be attached at station 94 (compared lower portion of FIG. 15 for spray deployment connection at 93). The essentially slack cable 92 is not shown in the left hand side of the view for clarity of illustration. A loop or bracket for receiving or holding the slack portion of the cable 92 to avoid any wheel entanglement or loose flapping of the cable may be provided anywhere along the vehicle or on the frame itself with respect to cables 92 and 92'. Such are not shown.

To be able to stow the booms in the positions seen in FIGS. 14-16, inclusive (for one side of each view) there are provided (particularly see FIGS. 14 and 15) upstanding vertical beams 100a braced as at 101a, such mounted on frame members 34 and 38. Fixed to the top or adjacent the top thereof are brackets 102 over which the booms 48 or 49 may be positioned, thus to retain same in the stowed position. As the booms may be swiveled on boom support members 60 and 61 by virtue of rotatable collars 66 and 67 and also pivoted around pins 72 and 73, respectively, with respect to yokes 70 and 71, the handling of the booms to be stowed or deployed is made in convenient fashion. A tie-down (not shown) may be employed with respect to the brackets 102 and to avoid jouncing the booms off the bracket if rough travel is to be encountered.

In operation of the device of the described figures, if one assumes a boom stowed in the fashion seen in FIGS. 14-16, inclusive, the front cable 91 or 91' will be connected at station 94 or 94'. This cable will be in essentially taut position or condition. The rear cable 92 or 92' will be in essentially slack position. To move the booms to spraying operation and position, the operator merely lifts the rear end of the boom sufficiently to clear the bracket 102 outer retainer and walks the boom (in an upward arc in FIG. 15) to essentially right angle position with the frame of the vehicle. At that juncture, cable 91' is reconnected at station 93'. The same is true with respect to the opposite boom, when it is deployed.

With the boom deployed in spraying position as seen downwardly in FIG. 15, to the right in FIG. 16 and toward the viewer in FIG. 14, the cables are essentially in the position of FIGS. 2 and 3. The wheels 54 and 55 are in contact with the ground. With forward motion of the vehicle, spraying may be undertaken through the tubings 47 from materials in one or more of the tanks carried by the frame, driven by suitable conventional pumps and controlled by conventional controls. Should an obstacle be encountered by wheel 55, or wheel 54, the respective boom 48 or 49 will rise vertically to surmount such, due to pivotal mounting of the inboard ends of the booms with respect to the yokes 70 and 71. Should it be desired for any reason to move or briefly displace the booms forwardly, the resilient mounting of cables 92 and 92' permit such forward movement of the booms.

FIGS. 14-19 Inclusive—General Description

Referring to the above described device of FIGS. 14-19, inclusive, such basically comprises a spray apparatus or boom support construction for use on a vehicle adapted to be pulled over the surface of a field to be sprayed. The spray apparatus and the boom construction thereof is adapted to deliver a liquified material along two substantially parallel, spaced apart, elongate field paths. Each of said paths is oriented substantially normal to the line of motion of the vehicle with one of said paths being positioned on each side of the vehicle. In actual operation, the tubing 47 seen mounted along the booms 48, 49 of the figures would also be mounted along the lower horizontal beam 63 in order to spray the central portion of the path being traversed by the vehicle. Alternatively, such tubing could be provided along the rear end of the vehicle frame (also not shown). The particular features of improvement of the subject invention lie in the boom suspension and mounting construction, as well as the extensions thereof to be described, rather than in the specific spray mechanisms, pipes, tubing, pumps, nozzles, etc. therefor. Accordingly, the latter are not detailed in the views for clarity of illustration of the boom carrying structures.

The vehicle shown in the views of FIGS. 14-19, inclusive has front and rear, spaced apart ends and opposed, spaced apart, substantially parallel sides thereof, thus to be substantially rectangular in overall form. Such shape is basically provided by the frame structural members 34-38, inclusive, and here also by the large tank 30 and the cradle 31 therefor mounted on the base frame.

There are a pair of boom support members 60 and 61, each rigidly affixed with respect to an opposite side of the vehicle and positioned adjacent, at or forward of the front end thereof. Each said boom support member is mounted in a fixed position lying in a substantially vertical plane substantially paralleling the side of said vehicle and disposed at a rearwardly inclined angle from the vertical of approximately 15° to 35°. There is a frame positioned on the vehicle at, adjacent to or forward of the front end thereof rigidly fixed with respect to the vehicle itself, here particularly to its underlying structural frame. Such frame includes means carrying abnd supporting the boom members in the rigid, spaced apart, relationship to one another at said location. The boom support members 60 and 61 are mounted on and fixed to the frame (particularly see FIG. 19) with a normally horizontal, first, upper beam member 62 rigidly interconnecting and spacing apart the boom support members 60 and 61 adjacent their upper ends. There are preferably provided two normally horizontal, transverse, parallel, vertically spaced apart beam members 62 and 63, such rigidly connecting together and spacing apart the upper and lower ends of members 60 and 61. In the balance of the frame, there are provided inboard (with respect to said beam support members) such typically normally vertical and normally horizontal additional frame members rigidly connected to one another and the transverse beam members whereas to make up an entire rigid frame structure connectible to the vehicle or its frame.

Elongate, normally straight boom members 48 and 49 are pivotally mounted on each respective boom support member 61, 60 close to the lower end thereof at or adjacent the inner end of each boom. Such booms are adapted to be swung from a first, substantially level, ground paralleling position substantially normal to the longitudinal axis and direction of travel of the vehicle to a second, upwardly angled position along the sides of the vehicle substantially paralleling the said sides and direction of travel of the vehicle, in a rearwardly directed orientation. Rotatable wheel means 54, 55 are connected to said booms 48, 49 at or adjacent the ends thereof on beams 52, 53 extending downwardly from the boom substantially normal to the longitudinal axis thereof. Such support the outer ends of the booms above ground level when they are in substantially horizontal orientation for spraying use.

Opposed, first, rearward cable means 92, 92' are connected with respect to each side of the vehicle, the upper ends of the boom support members and the upper transverse member 62 in such manner as to resiliently couple each said boom intermediate the ends thereof with the frame. Two second, forward cable means 91, 91' are additionally provided coupling each said boom intermediate the ends thereof with one of a plurality of positions on the frame adjacent each side of the latter and substantially forwardly, with respect to the vehicle, as well as the boom support members. The frame portions to which the second, forward cable means are connected preferably comprise a pair of substantially horizontal, spaced apart, parallel cable support beams 64 and 65, one such beam connected to and extending forwardly from the upper end of each of the boom support members 60 and 61 in substantial parallel relationship with the adjacent vehicle side or the longitudinal axis of the vehicle. Each second, forward cable means 91, 91' is removably connectible to its adjacent said cable support beam 64 or 65 at two alternative positions, the first, forward position 93, 93' being for boom extension, the second, rearward position 94, 94' being for boom storage along the side of the vehicle.

Means such as brackets 102 are provided on each side of the vehicle rearward of the first cable means 92, 92' connections to the frame for removably engaging an outboard portion of the respective boom on that given vehicle side for supporting such boom in a transport position substantially parallel to the vehicle side and extending at an angle of from approximately 15° to 35° from the horizontal, as well as rearwardly of the vehicle.

An 180° pivotable extension of the outer part of each boom may be provided, such mounted adjacent the outer, free end of each boom inboard of the wheel mounting thereon, as has been schematically indicated with respect to the showing of FIG. 14 at 56. Such pivotable extension may be extended from the position seen in FIG. 14 overlying boom 48, for example, axially outwardly 180° opposed to the illustrated position as an extension to the boom in one extreme pivotal position. The second extreme pivotal position is that illustrated in FIG. 14, both to be described in more detail with respect to other figures.

The inboard ends of each boom 48, 49 are pivotally mounted on pins 72, 73 in yokes 70, 71, the latter welded at their inner ends thereof to collars 66, 67. Collars 66, 67 are rotatably mounted at a fixed level adjacent the lower end of the respective boom support members 60, 61. The arms of such yokes 70, 71 extend downwardly from said collars at an angle from the horizontal.

Each of the boom support members 60, 61, as well as the cable support members 64 and 65 (which are preferably in the same vertical plane parallel to the vehicle side as the respective boom support members) are preferably positioned at least somewhat (and preferably substantially) outboard of the sides of the vehicle body. Additionally, the brackets 102 are also preferably positioned extending outboard of the sides of the vehicle body, but not necessarily to the extent of the beam support members and cable support members. Thus, in FIG. 15, such bracket mountings relative to the beam and cable support members permit somewhat inwardly angled boom orientation in storage and transport position so that there is a minimum lateral extension of the wheels 54, 55.

Rearwardly Mounted, Forwardly Folding Boom Construction (FIGS. 1-13, Inclusive)

Of the above title noted figures, FIGS. 7-10 are particularly directed to the extendable boom (311) construction at the ends of the basic boom members, such extension seen in action or opertion in FIGS. 2 and 3. This feature will be separately described when reached.

In the meantime, what is seen in the showings of the other figures (of those above listed in the above title) is a powered vehicle mounting (the specific example being a pickup truck) wherein the boom support members and frame therefore are positioned at the end of a skid carried by the rear end truck bed of the pickup truck. Positioned within the pickup truck bed are a basic structural frame (skid) carrying one or more liquid storage tanks and conventional piping, pumps, etc., whatever is conventionally required, in order to move the liquids to be sprayed to the tubing which will overlie the boom constructions. Such basic reservoir, pump drive, pipe interconnections and boom carried tubing do not constitute any part of the subject invention and are illustrated only to the extent required to show how such interengage between the parts of the vehicles, booms, etc.

Since the basic boom support members 60 and 61 of FIGS. 14-19, inclusive in the front mounting variation previously described have been set forth in detail, as well as the inboard frame members bracing same (and also providing sufficient frame structure to attach such to a vehicle frame or structure), applicant will utilize the numbering of FIGS. 14-19, insofar as possible, but primed, with respect to (1) the boom support members, (2) the cable support members and (3) the inboard rigid frame structure therebetween in describing the present figures. There are some minor differences in the frame construction seen in FIGS. 1-3, etc., compared to FIG. 19, largely comprising, in the upper portion thereof, the omission of members 80-83, inclusive. Additionally, since the boom support frame connections to the basic skid frame (or structural frame placed in the pickup truck bed) in FIGS. 1-3, etc. are forwardly of members 76 (76') and 77 (77'), not rearwardly as in FIGS. 14-19, inclusive, the underlying vehicle base structure seen in dotted lines in FIG. 19 (and the members 87-90, inclusive) are not seen in these views. Otherwise, where the members are structurally the same, they will be numbered the same as in FIGS. 14-16 and 19, but primed, as noted, in order to minimize further description and permit ready comparison with the frame structure so comparatively more visible in FIG. 19. Likewise, the booms will be numbered the same, but primed, as is the case with respect to the wheels and structural members. However, the support cables and their attachments will be renumbered in FIGS. 1-13, inclusive.

To compare, with respect to the corresponding members between the already described frame details of FIGS. 14-19, inclusive, and those of FIGS. 1-3, inclusive, and particularly utilizing the three-quarter perspective view of FIG. 19, therein looking downwardly from forwardly and above, one may note as follows. The basic boom support members 60' and 61' are provided, mounted at the critical 15-35 degree angle previously noted with respect to members 60 and 61 by virtue of the upper and lower transverse members 62' and 63'. The latter are fixed to the upper and lower ends of members 60' and 61', as two separate, transverse, parallel, vertically spaced apart beams. Looking particularly at the rear view of the vehicle illustrated in FIG. 2, and also at FIG. 4, one may see that the vertical structurals 76' and 77' connect at their lower ends to cross member 63' and extend vertically upwardly therefrom to the level of the top transverse beam 62'. Structurals 78' and 79' (FIG. 3) join the tops of members 76' and 77' to transverse top beam 62'. The horizontal structural braces 83' and 84' between members 76' and 77' are joined together adjacent their outer ends by members 85' and 86'. While, in the view of FIG. 3 (top view), it may be seen that members 80-83, inclusive are not present, such could be present, but are here replaced by angled bracing beams 200 and 201 which connect the upper transverse member 62' with respect to the cable carrying beams 64' and 65'.

Turning to the vehicle itself, it is a conventional pickup truck having a forward engine compartment 202, an operator's cab 203 and a rear truck bed generally designated 204. As may be seen in FIG. 3, the truck bed has a forward wall 205, side walls 206 and 207 and a lower floor 208 (see lower right center of FIG. 4). The normal rear gate for the pickup truck has been removed for the application of the boom mounting structure at the end of the tank carrying frame or skid which is received within the pickup truck.

The latter comprises elongate, floor received beams 209 and 210 which receive cross braces 211, 212 and 213 along the length thereof to rigidly connect longitudinally beams 209 and 210 to one another and serve (211 and 212) as cradles to receive the main tank 214.

The connection of the boom frame mounting construction to the basic floor structurals 209 and 210 is best seen in, first, FIG. 4 and, secondly, FIG. 2. This connection is made by beams 215 and 216, braced by structural members 217, to members 209 and 210, such being strapped as at 218 to vertical frame members 76' and 77' or welded, bolted or otherwise fixedly attached thereto. The base structural frame or skid in the pickup truck bed, made up of longitudinals 209 and 210 and transverse members 211-213, is closed at its rearward end by member 219 (FIG. 3). The latter may be bolted, clamped or otherwise fixed to member 84' to give additional strength in attachment of skid and boom mounting frame (not shown).

Two additional upwardly extending, outwardly angled sets of structural members 220 and 221 (particularly see FIGS. 1 and 2) are rigidly fixed or welded at their lower ends to longitudinal skid floor beams 209 and 210. The latter sets angle outwardly and upwardly past the tops of the side walls 207 and 208 of the pickup truck bed to provide means for fixing the skid position in the truck bed and an outwardly positioned base for the boom receiving brackets with member 221. Members 220 and 221 are joined together at the tops thereof by transverse, horizontal beams 222 and 223. In order to make the entire upper portion of the skid frame structure within the truck bed rigid and strong, straps or rods 224 join the upper portion of members 215 to the side junctures of members 222 and 220, while additional (or continuous) forwardly extending straps or rods 225 connect the said junctures of beams 220 and 222 with those of forwardmost beams 221 and 223. Forward members 221 carry brackets 226 on the upper outboard sides thereof, such adapted to receive the intermediate length portions of the booms 48', 49' thereon in stowed position as is best seen in FIG. 1, the left side of FIG. 2 and the left side of FIG. 3. Thus structure is detailed in FIG. 12.

Turning to the cable connections for this construction, such differ and function somewhat differently than those previously described with respect to the forward mounted frame structure and boom mounting of FIGS. 14-19, inclusive. In this case, the rearwardmost cable 227 is fixed at its outboard end 227a to the rear top side of boom 49' past the midpoint thereof. The pulley carrying engaging structure at the top end of angled boom support member 61' is detailed in FIG. 11 showing pulley position for a stowed boom. Thus, pulley sheave 228 carrying rotatable pulley wheel 229 mountable on a suitable pin therewithin is mounted on a shaft 230 connecting to the sides of member 96' at the upper end of member 61' (or 60'). Cable 227' is engaged by pulley wheel 229 (or vice versa) and, with the inboard end 227b' thereof, is connected to a coil spring 231' which is fixed at its inboard end to loop 232' on the forward face of transverse beam member 62'. The corresponding opposite cable and parts thereto on the other side of the frame structure from cable 227' are numbered the same, but not primed. The forward cable 233 is mounted in one of two manners. In both cases its outboard end 233a is connected to the forward edge of boom 49' past the midportion thereof. The inboard portion of cable 233 at 233b is preferably mounted on the forward end or adjacent the forward end of cable support beam 64' as at 234. However, alternatively, a front cable support connection 235 can be made at the top juncture of members 220 and 222 as seen in dotted lines in FIGS. 2 and 3.

FIG. 13 shows an alternative mode of connecting the inboard cable ends where the springs 231 and 231' centrally engage a single pin or loop 232 on member 62' and inboard end 227b of the cable is looped around structurals 201 and 78'.

FIGS. 7-10, Inclusive

In these particular figures, supplemented particularly by the showings of FIGS. 1-3, inclusive, there is detailed one mounting for the boom extensions (311) optionally mountable on the booms 48', 49' (or 48 and 49) adjacent the ends thereof. This boom extension structure is mounted on an inverted U-section (FIG. 10) platform 300 having an upper, normally horizontal (in spraying position of boom 49') surface comprising the base 301 of the inverted U. The normally vertical legs of the inverted U platform 300 are welded or otherwise fixedly attached to the boom 49' as at 302. An L shaped angle iron 303 is fixed to or against the normally forward leg of U member 300, thus to give one flange 304 thereof overlying, yet spaced upwardly from surface 301.

An angled arm 305, having inverted J shaped pin 306 fixed to the forward outboard face thereof (when the extendable boom length 311 is in its retracted position as seen in FIGS. 7, 8 and 10), is welded or otherwise fixedly attached to the normally forward leg of U member 300 (when boom 49' is in spraying position as seen in FIGS. 7-10, inclusive).

An L shaped section angle iron member 307 analogous to member 303 having upwardly extending leg 307a and bottom leg or flange 307b is pivotally mounted with respect to U member surface 301 by bolt 308 engaging both U member base 301 and flange or plate 307b of member 307. Top flange 304 of member 303 is relieved at its forward inboard edge providing a recess to receive the outboard (in the position of FIGS. 7, 8 and 10) portion of flange 307a at 304a. A pin or loop 309 is provided attached to one end of flange 307a to receive between it and pin 306 the coil spring 310. The actual elongate boom extension rod 311 is welded or otherwise fixedly attached to flange 307a of L member 307 at one end thereof (the inboard end in spraying use as in FIG. 9 or outboard end thereof in stowed use as in FIGS. 7, 8 and 10), spaced upwardly from flange 307b.

For the purpose of the immediate views of FIGS. 6-10, inclusive, the liquid feed tubes leading to the main spary boom are numbered 312 and 313 (particularly see FIG. 6), while the tubing leading to the boom extension 311 is numbered 314 (FIG. 6) in the passage thereof from member 62' to boom 49'. Tubing 315 on the spray boom itself is connected inboard to tubing 314.

In retraction of the spray boom extension 311, as is seen in FIGS. 7, 8 and 10, the L shaped member 307 is rotated around bolt 308 until boom 311 is aligned with and lying over main boom 49'. This position may also be seen in FIG. 1. In this position, the outboard end of flange 307a abuts against the rearward edge of recess 304a to prevent further rotation and thus positions the retracted spray boom in its proper, inboard, over-the-main boom aligned position. The over center position of spring 310 aids in maintaining the boom 311 in the desired retracted position of FIGS. 7, 8 and 10 (pulley flange 307a clockwise in FIG. 7 around bolt 308).

When plate 307 is pivoted 180° in a counterclockwise direction from the position of FIG. 7 to that of FIG. 9, the boom 311, which is spaced upwardly from flange 307b, slides over plate 304 so that the position of FIG. 9 is achieved. In this case, plate 304 lies between bottom flange 307b and the base of boom 311 which is fixed to flange 307a. At this juncture, spring 310 has gone over top dead center, as it were (from alignment with arm 305), and now, pulling between pins 306 and 309, tends to hold the assembly in the position of FIG. 9 with flange 307a in abutment with the free end or edge of flange 304. This fully extended position can be seen in FIGS. 2 and 3.

FIGS. 20 and 21

In certain circumstances, it is desirable to have a longer and more displaced lever arm provided with respect to the two positions of extension boom 311 (with respect to the showing of FIGS. 7-10, inclusive on boom 49') or its extension counterpart on the opposite boom 48'. In such circumstances, a structure is provided as in FIGS. 20 and 21. In this construction, all the parts which are the same or analogous to the same or like parts in FIGS. 7-10, inclusive are numbered the same, but primed. No discussion of these parts will be made except where parts differ in size, length, angle or connection position, as the structural assembly is essentially the same. They will not be redescribed except for the differences. FIG. 20 corresponds to FIG. 9 with the boom extended, while FIG. 21 is a figure corresponding precisely to FIG. 10, showing the boom in the retracted position.

The distinctions between the construction of FIGS. 20 and 21, as compared with that of FIGS. 7-10, inclusive, lie in, first, the greater height and greater outward angling of member 305', as compared to member 305. Secondly, instead of the pin 309 being fixed to flange 307a, pin 309' is instead fixed considerably outwardly along the length of boom 311', well past the outer end of boom 49' when the extension 311 is deployed. Thus it may be seen that, when plate member 307 is pivoted around bolt 308' to the position of FIG. 20, there is a powerful pull on boom 311' in a forward (upward in FIG. 20) direction by spring 310', thus strongly forcing or jamming the edge of plate 307b against the vertical flange or leg of member 303. The pull is through spring 310' and cable extension 317 which connects to pin 309'. Likewise, when the boom extension 311' is retracted as in FIG. 21 (also see analogous FIG. 7), the spring loading on cable 317 powerfully pulls the 180° acurately opposed member 307, in its vertical flange portion 307a, into the notch 304a (FIG. 7), thus locking the boom in retracted position in a much more powerful manner than the less leveraged construction of FIGS. 7-10, inclusive.

It should additionally be noted that, as is indicated in full lines in FIGS. 7, 8, 9 and 20, an overlying, inverted, L shaped flange may be provided mounted on boom 311 past collar 51' to overlie the boom extension portion 311 which passes over collar 51'. Such restraining flange prevents excessive upward prying or whip of boom extension 311 against the inboard pivotal mounting thereof.

General Considerations and Operation

First looking at the forwardly mounted boom carrying frame of FIGS. 14–19, inclusive, the following may be noted. First, the front cable structures 91 and 91', in spraying position, are fixed forwardly on cable carrying members 64 and 65 at positions 93 and 93'. This is the drive or pulling force for the boom and obstructions which are encountered by wheels 54 and 55 are handled in one of two ways. When there is a rising obstruction which is encountered by one or both of the wheels 54 and 55 on booms 48 and 49, the booms (or boom) will rise upwardly, such permitted by the pin mounting of the inboard ends of the booms on the yokes 70 and 71. The rear flexible cable mounting permits such rise by expanding the springs 231, 231', if necessary. When a drop-away (hole or depression) is encountered by one or both of the wheels 54, 55, the outboard level of the boom may drop somewhat due to the spring mounting of the rear cables 92, 92'. However, generally, the booms will be carried in level state by the combined cable action (with some resiliency of springs 231, 231') onto the next flat or rising level of the ground which engages tires 54 and 55 again.

In this system of FIGS. 14–19, inclusive, in order to stow the booms 48 and 49 rearwardly as may be seen in FIGS. 14-15, inclusive, each on one side of the towed vehicle, the front cable must be dropped back to its rearward position or attachment points 94, 94' on cable carrying members 64, 65. This repositioning of the front cable 91, 91' is sufficient to give enough slack to permit the rearward folding of the booms, but provides sufficient cable tension to lift the booms 48, 49 as they are pushed rearwardly by the operator so they will rise up over the receiving brackets 102. Thus it can be seen that, when the front mounted booms are positioned in the stowed position, the cables 91, 91' are under tension.

The rear cables 92, 92' are in slack position and may be gathered by any convenient means, such as a strap or loop on members 60, 61, to prevent any excessive sag of the cable. The optional rear cable tightening means as seen at 99, 100, 101 in the lower center of FIG. 15 will aid in such slack control. An actual cross cable connection (see cable 400 in FIG. 12) may be employed on the vehicle frame to provide a positive connection to pick up and gather any cable slack in the nontensioned cables of the cable pairs in any given situation. Thus cables 92, 92' are slack in boom stowage rearward, as are cables 233, 233' in boom stowage forward.

In order to give some idea of typical relative dimensions with respect to the structures just described, the following may be given. First, along cable carrying beams or members 64, 65, the distance from connection 93 to the top connection of beam support member 60 with the rearward end 64a of member 64 is 44 inches in a typical example. The distance from connection point 93 to connection point 94 is 15¾ inches. The distance from connection point 93 to opposite the forward face of vertical member 76 (FIG. 14) will be 25 inches. The distance, then, from the hinge pin 72 (FIG. 17) to the top of beam 64 would be 36 inches. The distance from a normal line from pin 72 through beam 60 to the connection of support member portion 60a and member 64a with one another at the top would be 40 inches. A typical angle of cable 91 in the full line position of FIG. 14, with respect to vertical 76, would be 35 to 39 degrees, more likely 36 to 38 degrees.

It may be seen that, because of the length of the booms and the drag through typical vegetation, crops or over land, with the friction of action of wheels 54 and 55, etc., if cables 91, 91' are not "rigid" or nonresilient, then the boom drag or pull would not be strong enough or equal between the booms and a boom could be pulled badly out of line. If a spring mounting were employed, the spring could be broken, or the spring disabled. On the other hand, limited resiliency of the rear cables is not objectionable with respect to relatively infrequent backing and maneuvering and such limited resiliency enables flexibility with respect to handling rising and falling obstacles and recesses in this modification. The action, however, as described, of FIGS. 14–19, inclusive differs substantially from that of FIGS. 1–6, inclusive with respect to stowage. And in any case, as noted below, the springs on the beams 62, 62', whether in forward or rearward mounting on a vehicle, are protected from over straining or breakage by a loop check as seen in FIG. 13 at 227b.

Turning to, again, FIGS. 1–6, inclusive, the same relative dimensions with respect to the boom support members and cable carrying members would apply. However, there is not here provided the rear connection for the front drive cables 233, 233' in this construction as the boom folding is forward and such utilizes the limited resilient or spring mountings on the rear cables 227, 227' at 231 and 231' as seen in FIG. 13. The loop slack 227b is equivalent to the extra slack provided by the location change from point 93 to point 94 in FIGS. 14–19, inclusive.

Whether the front cables 233, 233' are mounted on the cable beams 64' and 65' (preferred) or more forwardly at 235, 235' (dotted lines FIGS. 3 and 2), again, the front cable is not in any way tension relieved. That is, it is a straight pull. Any yielding when wheels 54', 55' strike a rising obstacle is handled by the rising of booms 48', 49' so the wheels may rise thereover.

In stowage of the booms of FIGS. 1–6, inclusive it should be noted that some sort of limit of outward pull of cables 227, 227' as seen in FIGS. 13 (the loop around beams 78', 201) must be present for two purposes. In the first place, if the yield of springs 231, 231' is not limited, in backing or storing of the boom, such could be swung past their resiliency. Additionally, the stopping or catching of the loop 227b in FIG. 13 on beam 78' is necessary to cause the outer end of the boom to rise as it is pushed forwardly by the operator to engage over brackets 102. Otherwise, the operator would have to lift the boom up to that bracket angle elevation and such would not be desirable, in addition to that threat on the spring 231. Further, in boom stowage one cable is always maintained in tension holding the given boom up to the given bracket.

It may thus be seen that, in both applications of the inventive boom mounting construction (forward mounted and rear mounted), it is a combination of features that make the adequate and advantageous operation and function possible. First, it is necessary that there be provided the rearwardly angled boom support members 60, 61, etc. These are best basically positioned with respect to one another by the upper and lower transverse booms 62, 63, etc. Mounted forwardly from the upper ends of the rearwardly inclined boom support members 60, 61, etc. are cable carrying horizontal beams 64, 65, etc. A frame structure is provided to rigidly and strongly fix the functional boom support members and cable carrying members with respect to one another and the vehicle or its frame (or a skid received by the vehicle, for example, as in FIGS. 1–6, inclusive).

The booms themselves are carried by a uniquely advantageous structural mounting involving the rotatable collars 66, 67, etc. carrying the downwardly angled yokes 70, 71, etc. The rotatable collars on the angled boom support members, coupled with the pin mountings 72, 73, etc. of the inboard ends of the booms in the yokes 70, 71, etc. give a uniquely flexible yet dimensionally stable mounting for the elongate booms which permit their ready deployment and recovery.

There is then provided the double cable mounting which involves an essentially unyielding pull or drive cable 91, 91', 233, 233', such typically fixed, for spraying purposes, or deployment of the booms, at the forward end of the cable carrying beams 64, 65, etc. Alternate forward positions may be employed, as at 235 in FIGS. 2 and 3, but are not preferred. There is additionally provided a limitedly resiliently mounted rear cable. It should be particularly noted that, even in the frame construction of the forwardly mounted boom, it is most preferred that a loop construction as at 227b in FIG. 13 be provided over inboard structural frame members 78 and 79 with respect to springs 95, 95', thus to limit the outboard possible pull on those springs so they will not be overstressed. This construction is not detailed in FIG. 15, where it could be seen, but what would be provided would be loops running from 92a and 92a' around the structurals 78, 79, respectively, so that 92a, 92a', in FIG. 15 could not be pulled outwardly past structurals 78 and 79 in the view of FIG. 15. Such would be accomplished by inboard loop constructions on cables 92, 92' precisely as seen in FIG. 13 for cable 227.

When it comes to storage of the booms, in the forwardly mounted construction in FIGS. 14–19, inclusive, it is seen that it is necessary to provide the two point mounting (along beams 64, 65) of cables 91, 91' to give enough slack to permit inboard storage to the booms, yet keep sufficient tension to raise the booms, as they are pulled to the left in FIG. 14 and FIG. 15, so that the operator need not himself upwardly lift the booms 48, 49. Likewise, in the reverse storage of FIGS. 1–6, inclusive, it is the loop 227b abutting at its inboard end on beam 78' (FIG. 13) as cable 227 is pulled out which limits the slack of the rear cables 22, 227' as the booms are pushed forwardly in the view of FIG. 3, thus to cause those booms to rise to their brackets 226. The cable 400 in FIG. 12 is a retainer cable which may be provided at each front side of the skid to pass over the large tank 214 to pick up the slack in the opposite front cable 223, 223' when the booms 48', 49' are in stowed position. Such connection is not shown in FIG. 1 for cable 223 thus to indicate there is a slack position thereof when boom 49' is stowed.

It thus may be seen that an extremely strong, versatile boom support system utilizing only cables and manual operator power may be provided as illustrated and described. The versatility of the basic boom/cable carrying frame permits optional forward or rearward mounting with respect to a vehicle as shown in the two examples. It is to be understood that the forward mounting is not limited to a towed vehicle and the rearward mounting is not limited to a powered vehicle. However, in order to show both a towed form and a powered form, the examples illustrated were selected. Looking at FIG. 14, if the basic vehicle structural frame were to be extended to the left therein, the frame mounting of the earlier figures (FIGS. 1–6, inclusive), or for that matter, the frame mounting of FIGS. 14–19, inclusive, could be mounted to the left of tank 30 in the view of FIG. 14. In such case, the orientation of the frame would be the same as seen in FIG. 14, but two things would be different. First, the booms would fold forwardly, rather than rearwardly in the view. Secondly, on the cable mounting beams 64 and 65, there would not be provided the rearward mounting 94, 94' of the front pull or drive cable. Said otherwise, the action in folding the booms would be the same as in FIGS. 1–6, inclusive. There would have to be provided, on the front end of the tank, or forwardly thereof on the frame, vertical beam members 100a with brackets 102 to receive the booms in forward folded position.

With respect to the powered vehicle of FIGS. 1–6, inclusive, should a base structure be built forward of the hood 202, welded or otherwise attached to the vehicle frame, then the front mounting as seen in FIG. 14 could be provided on the pickup truck. In this case, the booms would fold rearwardly. However, it can be seen that, in such case, the booms at the angle of inclination preferred would block off the cab doors and thus such a mounting would not be very practical for this particular powered vehicle. Such would be operable, however, probably through the open windows of the cab or with third parties to free the booms and mount them from and into storage position with the driver already in the cab.

Thus it is seen that an extremely versatile, elongate boom mounting and handling system and apparatus has been provided, such adapted for both front and rear mounting with respect to a vehicle of the proper construction. The booms, when deployed or extended, are pulled by a nonresilient cable, the boom mounting yet permitting the booms to rise upon the support wheel encountering a rising obstacle. The double cable suspension permits adequate and proper suspension of the booms when the boom support outboard wheels encounter a falling away recess or the like. In both cases of forward and rearward mount of the boom support construction or frame, the booms are recoverable into a transport and storage position with a minimum of effort on the part of the operator with one cable at all times supporting each boom, even in stowed position, and aiding in the upward deployment and support of the boom to such stowed position. Likewise, as the boom comes down and out from the bracket, in reverse action, the cable supports the boom all the way to ground wheel contact.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Spray apparatus for use on a vehicle adapted to be pulled or driven over the surface of a field to be sprayed, said spray apparatus adapted to deliver a liquified material along to said substantially parallel, spaced apart, elongate field paths, each said path oriented substantially normal to the line of motion of the vehicle and one of said paths positioned on each side of said vehicle, said vehicle having front and rear, spaced apart ends and opposed, spaced apart, substantially parallel side thereto, a pair of structural boom support members, each rigidly affixed with respect to an opposite side of the vehicle and positioned behind the rear end thereof, each said boom support member being mounted with respect to said vehicle in a fixed position lying in a substantially vertical plane substantially paralleling the side of said vehicle and disposed at a rearwardly inclining angle from the vertical of approximately 15 degrees to 35 degrees, an elongate, normally straight boom having an inner end and an outer end pivotally mounted on each said boom support member close to the lower end thereof and adjacent to the inner end of said boom and adapted to be swung from a first, substantially level, ground paralleling position substantially normal to the longitudinal axis and direction of travel of said vehicle to a second, upwardly angled position along the side of said vehicle substantially paralleling the said side and direction of travel of said vehicle, in a forwardly directed orientation, the inboard end of each boom being pivotally mounted in one end of a yoke, said yoke fixed at the other ends thereof to a collar rotatably mounted at a fixed level adjacent the lower end of a boom support member, a frame positioned on said vehicle behind said rear end thereof and rigidly fixed with respect to said vehicle rear end, said frame including means carrying and supporting said two boom support members in rigid, spaced apart relationship to one another adjacent to said vehicle rear end and said frame including two normally horizontal, transverse, substantially parallel, vertically spaced apart beam members, said transverse beam members rigidly connecting together and spacing apart the upper and lower ends of the boom support members with respect to one another, said frame also including a pair of substantially horizontal, spaced apart, substantially parallel axial beams, one such axial beam rigidly connected to and extending forwardly from the upper end of each of the boom support members in substantial relationship with the adjacent vehicle side, said frame also including such additional internal frame structural members as to fix the said boom support members, transverse beam members and axial beams in a rigid, integral structural array at the rear of said vehicle, two opossed, first rearwardly positioned cable means, one such first rearward cable means resiliently coupling each said boom intermediate the ends thereof by an outboard end of said first rearward cable means with the substantial midpoint of the upper transverse beam member of said frame by an inboard end of said first rearward cable means, a resilient spring positioned in each first rearward cable means at the inboard end thereof, means for limiting the outward resilience of each said spring comprising a cable loop check on the inboard portion of each said first rearward cable means, said loop checks encircling forwardly extending portions of said frame positioned inboard of said boom support memebers, whereby when said booms are moved forwardly for stowage, the first rearward cables will cause the free ends of said booms to rise upwardly, the booms maintained in their upward position by said first rearward cables, two opposed second, forward cable means, one such second forward cable means coupling each said boom intermediate the ends thereof by an outboard end of said second forward cable means with one of an axial beam member of said frame and a portion of said vehicle itself at a position substantially forwardly, with respect to said frame, of said boom support member upper ends by means of the inboard end of said second forward cable means, each second, forward cable means being removably connectible to one of the axial horizontal beams at a forward position thereon for lateral beam extension, means on each side of said vehicle positioned forwardly of the said second, forward cable means connections to said frame for removably engaging an outboard portion of the boom on that vehicle side for supporting same in a stowage, transport position substantially parallel to said vehicle side and extending upwardly at an angle from approximately 15 degrees to 35 degrees from the horizontal, as well as forwardly on said vehicle, and rotatable wheel means connected to said booms outboard of said first and second cable connections thereto and extending downwardly from said booms substantially normal to the longitudinal axes thereof whereby to support said booms above ground level in substantially horizontal orientation in spraying use.

2. Apparatus as in claim 1 wherein the wheel means are positioned ahead of the booms in the direction of motion of the vehicle when the booms are in the normally substantially horizontal spraying position.

3. Apparatus as in claim 1 wherein the boom support members and frame portions associated therewith are both positioned aft of the rear end of said vehicle, the boom support members are spaced outwardly of the vehicle sides and the booms fold forwardly from adjacent said vehicle rear end outboard of the vehicle sides to engage the said support means in transport position.

4. Spray apparatus for use on a vehicle adapted to be pulled or driven over the surface of a field to be sprayed, said spray apparatus adapted to deliver a liquified material along to substantially parallel, spaced apart, elongate field paths, each said path oriented substantially normal to the line of motion of the vehicle and one of said paths positioned on each side of said vehicle, said vehicle having front and rear, spaced apart ends and opposed, spaced apart, substantially parallel sides thereto, a pair of structural boom support members, each rigidly affixed with respect to an opposite side of the vehicle and positioned ahead of the front end thereof, each said boom support member being mounted with respect to said vehicle in a fixed position lying in a substantially vertical plane substantially paralleling the side of said vehicle and disposed at a rearwardly inclined angle from the vertical of approximately 15 degrees to 35 degrees, an elongate, normally straight boom having an inner end and an outer end pivotally mounted on each said boom support member close to the lower end thereof adjacent the inner end of said boom and adapted to be swung from a first, substantially level, ground paralleling position substantially normal to the longitudinal axis and direction of travel of said vehicle to a second, upwardly angled position along the side of said vehicle substantially paralleling the said side and direction of travel of said vehicle, in a rearwardly directed orientation, the inboard end of each boom being pivotally mounted in one end of a yoke, said yoke fixed at the other ends thereof to a collar rotatably mounted at a fixed level adjacent the lower end of a boom support member, a frame positioned on said vehicle ahead of said front end thereof and rigidly fixed with respect to said vehicle front end, said frame including means carrying and supporting said two boom support members in rigid, spaced apart relationship to one another adjacent said vehicle front end, said frame including two normally horizontal, transverse, substantially parallel, vertically spaced apart upper and lower beam members, said transverse beam members rigidly connecting together and spacing apart the upper and lower ends of the boom support members with respect to one another, said frame also including a pair of substantially horizontal, spaced apart, substantially parallel axial beams, one such axial beam rigidly connected to and extending forwardly from the upper end of each of the boom support members in substantial parallel relationship with the adjacent vehicle side, said frame also including such additional internal frame structural members as to fix said boom support members, beam members and axial beams in a rigid, integral, structural array at the front of said vechicle, two opposed, first, rearwardly positioned cable means, one such first rearward cable means resiliently coupling each said boom intermediate the ends thereof by an outboard end of said first rearward cable means with the substantial midpoint of the upper transverse beam member of said frame by an inboard end of said first rearward cable means, said inboard end of said first rearward cable means being connected to said upper transverse beam member by a spring, two opposed, second forward cable means, one such second forward cable means coupling each said boom intermediate the ends thereof by an outboard end of said second forward cable means with one of a plurality of positions on an axial beam of said frame at a position substantially forward, with respect to said frame, of said boom support members, by means of the inboard end of said second forward cable means, each second, forward cable means being removably connectible at its inward end to one of said axial horizontal beams at two alternative positions: a first, foward position thereof used for lateral beam extension and a second, rearward position thereof being used for boom storage along the side of the vehicle, said cable in said second rearward connection operative to cause the free end of said boom to rise upwardly as said boom is swung rearwardly to its storage position with said upward position maintained by side cable, means on each side of said vehicle positioned rearwardly of said first cable means connections on said frame for removably engaging an outboard portion of the boom on that vehicle side for transporting same in a transport position substantially parallel to said vehicle side and extending at an angle of from approximately 15 degrees to 35 degrees from the horizontal, as well as rearwardly of said vehicle, and rotatable wheel means connected to said booms outboard of said first and second cable connections thereto and extending downwardly from said booms substantially normal to the longitudinal axes thereof whereby to support said booms above ground level in substantially horizontal orientation and spraying use.

5. Apparatus as in claim 4 wherein the wheel means are positioned ahead of the beam in the direction of motion of the vehicle when the booms are in the normally substantial horizontal spraying position.

6. Apparatus as in claim 4 wherein the boom support members and frame portions associated therewith are both positioned forward of the front end of said vehicle, the boom support members are spaced outwardly of the vehicle sides and the booms fold rearwardly from adjacent said vehicle front end outboard of the vehicle sides to engage the said support means in transport position.

7. Apparatus as in claim 4 wherein the said boom support members are positioned substantially outboard of the sides of said vehicle body, the means for removably engaging a portion of each boom on each of the vehicle sides rearward of said boom support members for supporting same in transport position also being positioned outboard of the sides of said vehicle body.

8. Spray apparatus for use on a vehicle adapted to be pulled or driven over the surface of a field to be sprayed, said spray apparatus adapted to deliver a liquified material along two substantially parallel, spaced apart, elongate field paths, each said path oriented substantially normal to the line of motion of the vehicle and one of said paths positioned on each side of said vehicle, said vehicle having front and rear, spaced apart ends and opposed, spaced apart, substantially parallel sides thereto, a pair of structural boom support members, each rigidly affixed with respect to an opposite side of a vehicle and positioned closely adjacent to but at one end thereof, each said boom support member being mounted in a fixed position lying in a substantially vertical plane substantially paralleling the side of said vehicle and disposed at a rearwardly inclined angle from the vertical of approximately 15 to 35 degrees, an elongate, normally straight boom having an inner and an outer end pivotally mounted on each said boom support member close to the lower end thereof and adjacent to the inner end of said boom and adapted to be swung from a first, substantially level, ground paralleling position substantially normal to the longitudinal axis and direction of travel of said vehicle to a second, upwardly angled position along the side of said vehicle substantially paralleling the said side and direction of travel of said vehicle, the inboard end of each boom being pivotally mounted in one end of a yoke, said yoke fixed at the other ends thereof to a collar rotatably mounted at a fixed level adjacent to the lower end of a boom support member, a frame positioned on said vehicle at said one end thereof and rigidly fixed with respect to said vehicle end, said frame including means carrying and supporting said two boom support members in rigid, spaced apart relationship to one another adjacent to said vehicle one end and said frame including two normally horizontal, transverse, substantially parallel, vertically spaced apart upper and lower beam members, said transverse beam members rigidly connecting together and spacing apart the upper and lower ends of the boom support members with respect to one another, said frame also including a pair of substantially horizontal, spaced apart, substantially parallel axial beams, one such axial beam rigidly connected to and extending forwardly from the upper end of each of the boom support members in substantial parallel relationship with the adjacent vehicle side, said frame also including such additional internal frame structural members as to fix said boom support members, beam members and axial beams in a rigid structural array at said end of said vehicle, two opposed, first, rearwardly positioned cable means, one such first cable means resiliently coupling each said boom intermediate the ends thereof by an outboard end of said cable means with the substantial midpoint of the upper transverse beam member of said frame by an inboard end of said cable means, two opposed, second, forwardly positioned cable means, one such second forward cable means coupling each said boom intermediate the ends thereof by an outboard end of said cable means with an axial beam of said frame substantially forward, with respect to said frame, of said boom support member upper ends by an inboard end of said cable means, each of said booms pivotable against the resistance of one of said cable means inwardly and upwardly to an inclined position against said vehicle for storage with said inclined position maintained by said resisting cable, means on each side of said vehicle spaced apart from said second, forward cable means connections to said frame for removably engaging an outboard portion of the boom on that vehicle side for suppporting same in a transport position substantially parallel to said vehicle side and extending upwardly at an angle from approximately 15 degrees to 35 degrees from the horizontal, lying alongside said vehicle, and rotatable wheel means connected to said booms outboard of the first and second cable connections thereto and extending downwardly from said booms substantially normal to the longitudinal axis thereof, whereby to support said booms above ground level in substantial horizontal orientation in spraying use.

9. Apparatus as in claim 8 wherein the wheel means are positioned ahead of the booms in the direction of motion of the vehicle when the booms are in the normally substantially horizontal spraying position.

10. Apparatus as in claim 8 wherein the boom support members and frame portions associated therewith are both positioned aft of the rear end of said vehicle, the boom support members are spaced outwardly of the vehicle side and the booms fold forwardly from adjacent said vehicle rearend outboard of the vehicle sides from spraying position to engage the said support means in transport position.

11. Apparatus as in claim 8 wherein the boom support members and frame portions associated therewith are both positioned forwardly of the front end of said vehicle, the boom support members are spaced outwardly of the vehicle sides and the booms fold rearwardly from adjacent said vehicle front end outboard of the vehicle sides to engage the said support means in transport position.

12. Apparatus as in claim 8 wherein the boom support members are positioned outboard of the sides of said vehicle body, as are the means for removably engaging a portion of each boom on each vehicle side for supporting same in transport position.

* * * * *